United States Patent [19]

Antalfy et al.

[11] Patent Number: 5,098,524
[45] Date of Patent: Mar. 24, 1992

[54] COKE DRUM UNHEADING DEVICE

[75] Inventors: Leslie P. Antalfy; Marcus R. Reaves, both of Houston; Donnie W. Alexander, Corpus Christi, all of Tex.

[73] Assignee: Flour Corporation, Irvine, Calif.

[21] Appl. No.: 627,560

[22] Filed: Dec. 10, 1990

Related U.S. Application Data

[63] Continuation of Ser. No. 226,431, Jul. 29, 1988, abandoned.

[51] Int. Cl.⁵ ................................. C10B 1/04
[52] U.S. Cl. ........................... 202/96; 196/130; 202/252; 220/211
[58] Field of Search ............... 202/121, 241, 242, 246, 202/252, 261, 96; 208/131; 196/122, 130; 220/211, 315, 335, 337; 110/173 R, 176, 177; 126/192, 194, 197; 122/498; 432/250; 49/340; 292/96, 201, 122

[56] References Cited

U.S. PATENT DOCUMENTS

| | | | |
|---|---|---|---|
| 911,524 | 2/1909 | Plantinga | 202/252 |
| 1,615,878 | 1/1927 | Laird | 202/252 |
| 1,871,932 | 8/1932 | Watts et al. | 208/131 |
| 1,874,833 | 8/1932 | Taylor . | |
| 2,226,501 | 12/1940 | Mekler et al. | 208/131 |
| 2,776,854 | 1/1957 | Billstrom | 292/96 |
| 2,834,504 | 5/1958 | Annicq | 220/211 |
| 3,888,045 | 6/1975 | Piegza | 49/340 |

FOREIGN PATENT DOCUMENTS 0265096 4/1988 European Pat. Off. .
210294 1/1967 Sweden ............... 220/211

Primary Examiner—Joye L. Woodard
Attorney, Agent, or Firm—Lyon & Lyon

[57] ABSTRACT

A coke drum unheading device having an actuator system operable from a location remote from a drum outlet. The actuator is adapted to move a drumhead between closed and open positions and to retain the drumhead in a closed position under load.

5 Claims, 4 Drawing Sheets

COKE DRUM UNHEADING DEVICE

This is a continuation of application Ser. No. 07,226,431, filed on July 29, 1988, now abandoned.

BACKGROUND OF THE INVENTION

The field of the present invention is apparatus for dispensing and safely controlling bulk materials such as petroleum coke or other analogous products.

Facilities for the manufacture of bulk materials such as petroleum coke and the like usually include means for producing and storing the produced output prior to shipment. In the specific case of petroleum coke, high boiling petroleum fractions are processed in one or more large volume drums. FIG. 1 illustrates a typical petroleum coke production facility, commonly known as a delayed coker, comprising a pair of coke drums mounted in a concrete and/or steel support structure. The drums are positioned above an apron having openings forming the entrance to coke chutes extending below the apron.

In the petroleum coking process high boiling (greater than 425° C.) hydrocarbons are heated to about 500° C. and put into a large drum where thermal cracking of the molecules takes place. This thermal cracking produces small molecules which exit the drum, and larger molecules which remain in the drum to form a solid residue known as petroleum coke. When one drum fills up with the residue, the inlet hydrocarbon stream is switched to an empty drum. The full drum is then steamed to remove residual hydrocarbon and then the coke mass within the drum is cooled by quenching with water. After cooldown to about 95° C. the quench water is drained, the coke drum bottom and top covers (heads) are removed, and the coke is removed using high pressure water jets. This process is typically known as delayed coking. The heads are then replaced and the empty drum is available for the feed switch when the other drum fills up. The process is continued using this alternating drum technique.

As shown in FIG. 1, the outlets of the coke drums are closed during the coke production process step by means of steel drumheads that are secured to the drums by a plurality of bolts disposed about the circumference of the coke drum outlets. For a typical coke production facility, the drumheads are approximately seven feet in diameter and five inches thick.

The coke drums are alternately unheaded on a time schedule depending on the charge rate of the unit, the coke yield and the number of drums utilized. In current practice the drumheads are manually removed ("unheaded") by operators who remove the drumhead bolting using pneumatic impact wrenches. In order to maintain coke production schedules and a steady coker unit output stream, it is essential that the unheading operation be safely and expeditiously performed. In the production facility of FIG. 1, unheading typically takes about ten to thirty minutes.

During the unheading of the coke drums of FIG. 1, the drumhead is supported in place by an adjustable unheading cart that is typically mounted on tracks. After the head bolts are removed, the drumhead is lowered from the coke drum outlet. The head and the cart are then rolled to the side to fully expose the open outlet. A collapsible chute is hoisted from the deck to tie the coke drum outlet to the coke chute in the drum support structure to prevent spillage during coke removal. The coke is then "cut" from the drum by (a) high pressure water jet(s). This operation of removing coke from the drum takes around two to six hours. The drum is subsequently reheaded by reinstalling the head bolts. The reheading operation takes around fifteen to forty minutes.

The above-described practice has worked relatively satisfactorily over the years for the production of "sponge coke", which forms a mass inside the coke drum that will normally support itself and remain intact, even with the drumhead removed. However, if, as occasionally occurs, the coke drum fails to properly drain off water used for quenching the hot coke, a combined hydrostatic and coke load with a total weight around 100 tons could act on the drumhead, rendering bolt removal difficult and subjecting the unheading cart to excessive loads. An inadequate drain may also result in an uncontrolled discharge from the drum of high temperature (80°-95° C.) water, steam, coke slurry or coke particle streams as the drumhead is being lowered, subjecting personnel to a hazardous situation.

With the use of certain types of feed stocks which are becoming more prevalent, "shot coke" is produced in lieu of sponge coke. "Shot coke" has the consistency of small BB pellets which may or may not be agglomerated into large "coke balls." "Shot coke" and the associated "coke balls" may not form a self supporting mass in the coke drum and may therefore behave as a liquid to impose high hydraulic load on the head similar to water. This fluid-like behavior of the "shot coke" will force the drumhead down with considerable force onto the coke drum unheading cart. The coke can also flow out with significant velocity from the gap between the drum and the partially lowered head, a potential hazard to operating personnel, and, if the unheading cart is pinned in place by the partially lowered head, may spread onto the unheading deck and equipment below the deck. The coke's fluidity also increases the potential for inadequate drainage of quench water by its tendency to plug the drainage outlets, again leading to excessive loads on the drumhead and the unheading cart. Thus, "shot coke" production entails the dual problems of safety due to excessive and uncontrolled discharge, and the disruption of production feed cycles due to excessive drumhead and unheading cart loading.

Accordingly, an alternative method of removing a coke-drumhead, providing the ability to withstand the high bottom head loads developed in the case of an inadequate quench water drain, controlling and directing hot water and particulate discharge via the bottom head, enabling the unheading operators to distance themselves from the coke drum outlet during drumhead removal and maximizing coke production throughput, would be desirable.

SUMMARY OF THE INVENTION

The present invention is directed to a coke drum unheading device in a delayed coker adapted to achieve the aforementioned objects. To that end, means are provided for moving the coke drumhead between closed and open positions with respect to the coke drum, which means are operable from a location remote from the coke drum outlet. Such means are supported from suitable fixed structure, preferably from the coke drum itself.

DETAILED DESCRIPTION OF THE PREFERRED EMBODIMENT

The preferred embodiment of the present invention will be described with reference to FIGS. 2–6.

Figure 1:
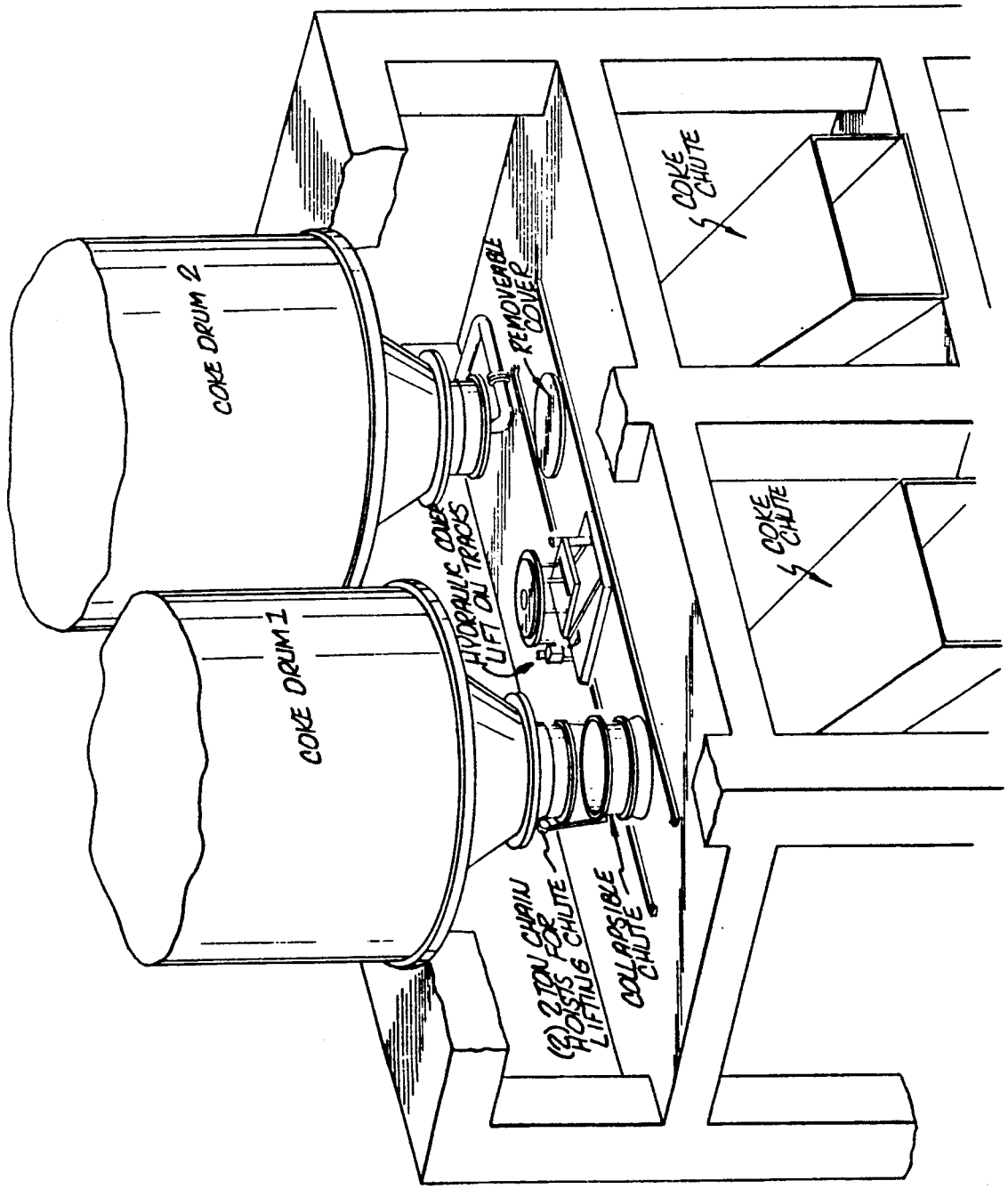
FIG. 1 is a view of a prior art coke drum system with support structure having a section broken away for clarity.
Figure 2:
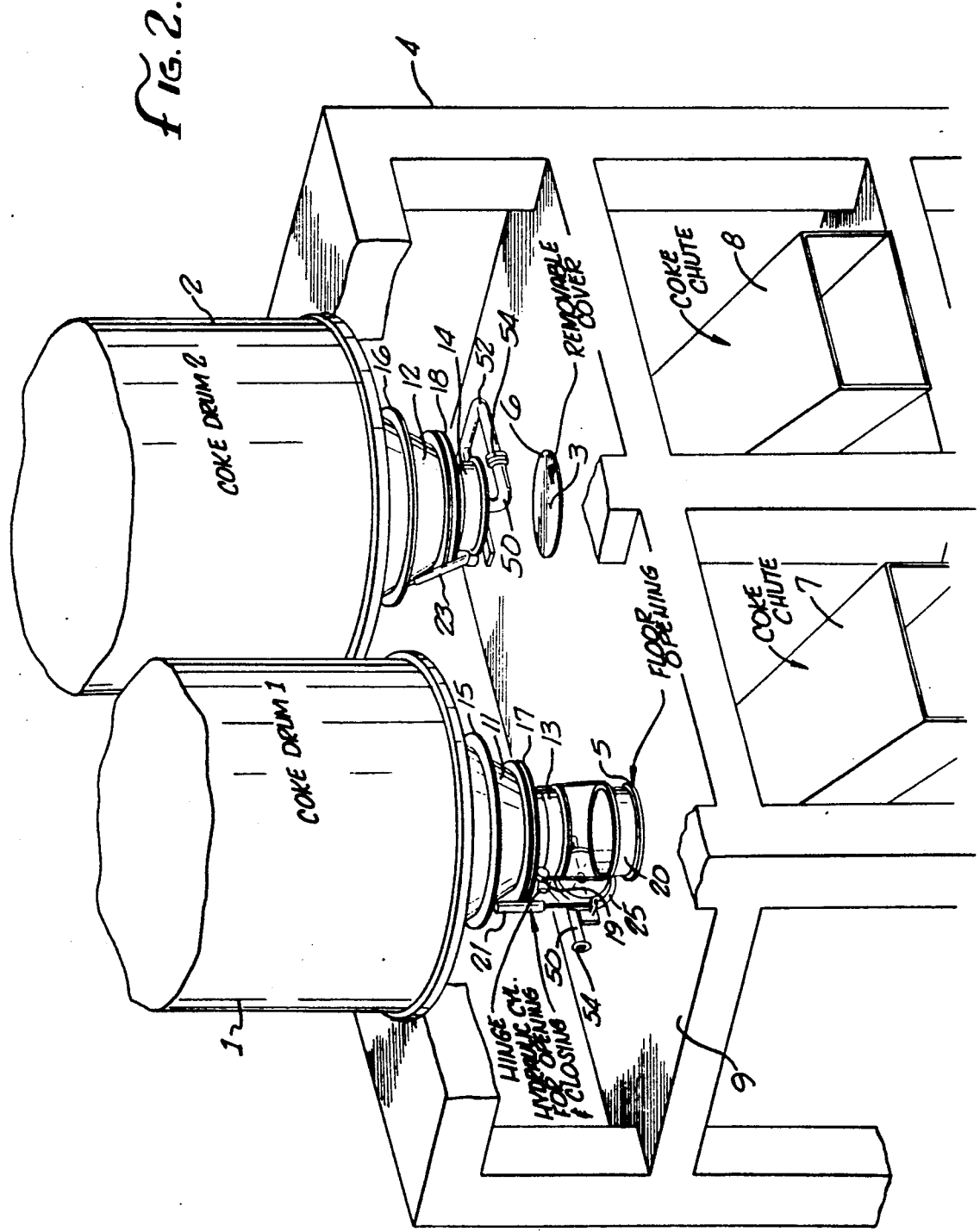
FIG. 2 is a view of a coke drum system with support structure constructed in accordance with the present invention, having a section broken away for clarity.
Figure 3:
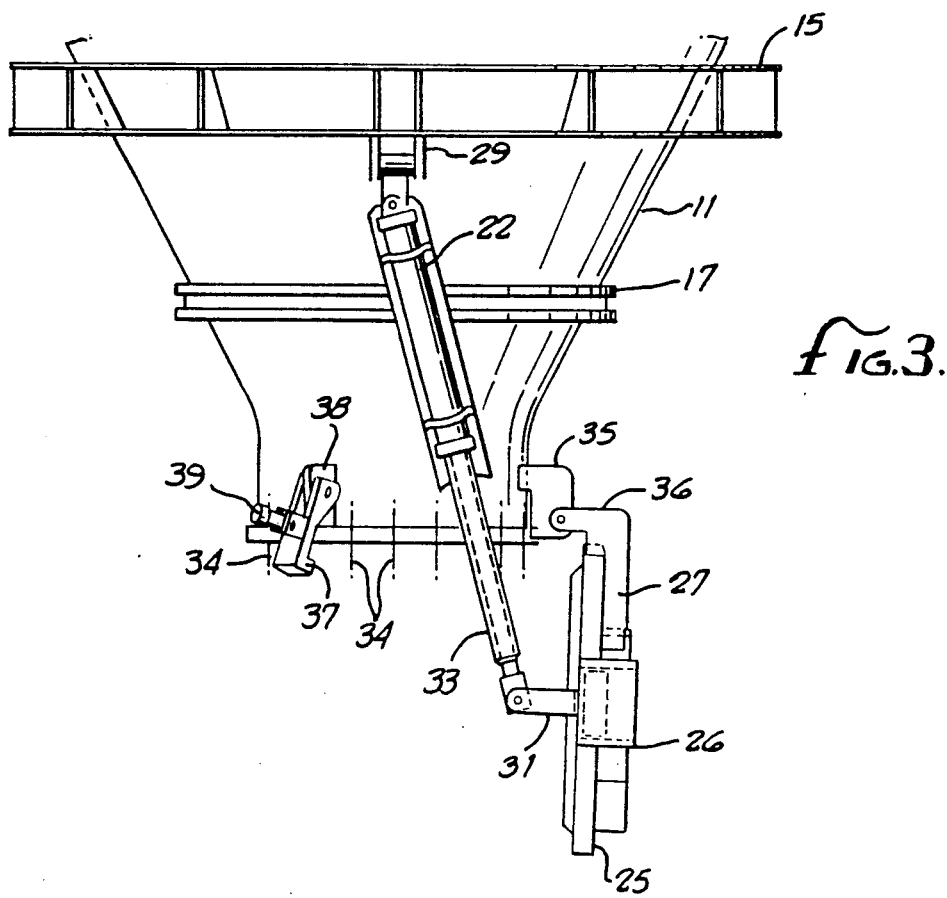
FIG. 3 is a side view of a coke drum bottom section constructed in accordance with the present invention showing a drumhead in an open position.
Figure 4:
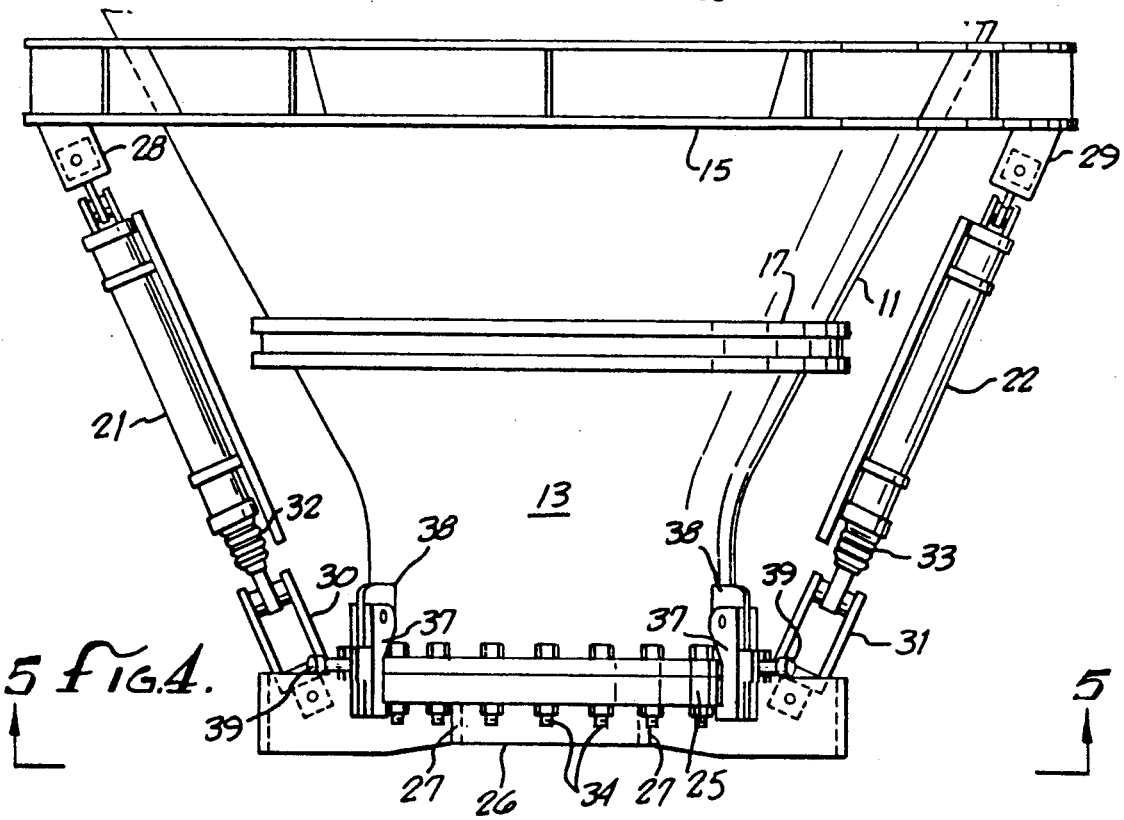
FIG. 4 is a front view of a coke drum bottom section constructed in accordance with the present invention showing a drumhead in a closed position.
Figure 5:
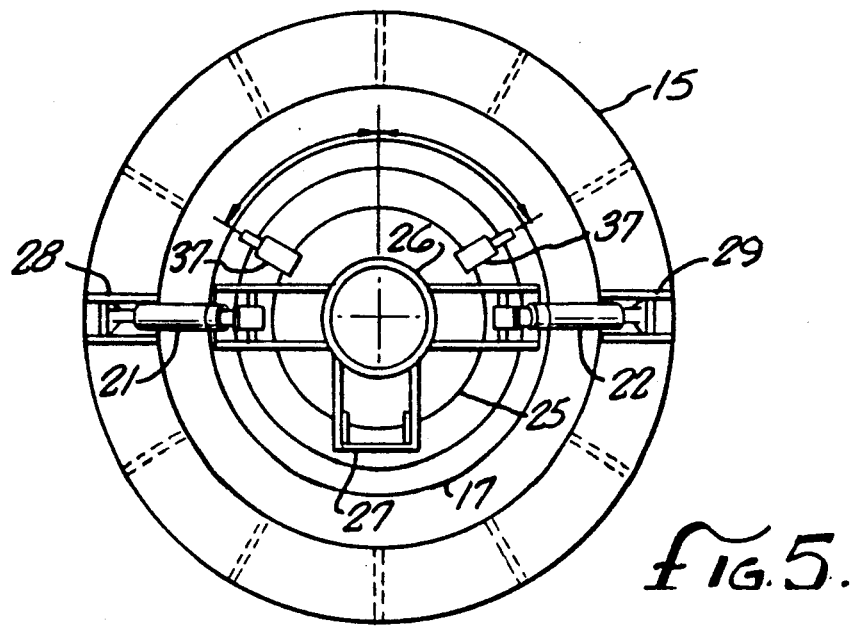
FIG. 5 is a cross-sectional view of the coke drum bottom section of FIG. 4 taken along line 5—5.

Referring to FIG. 2, the unheading device of the present invention is shown in a two-drum system configuration of a delayed coker unit. A first coke drum 1 and a second coke drum 2 of generally cylindrical shape are positioned in a concrete and/or steel drum support structure 4 over a pair of openings 5 and 6, respectively, which are closed by removable covers 3 when coking operations are in progress. The openings 5 and 6 form the entrances to a pair of chutes 7 and 8 extending from the unheading deck 9 that transport the coke from the drums 1 and 2 to a concrete apron for removal and subsequent processing.

The coke drums 1 and 2 comprise generally frusto conical bottom sections 11 and 12 which terminate at generally cylindrical drum outlets 13 and 14, respectively. Circumferentially mounted to the bottom sections 11 and 12 are upper stiffener ring assemblies 15 and 16, respectively, that provide support for the actuator means to be described hereinafter. Below the ring assemblies 15 and 16 are additional stiffener ring assemblies 17 and 18 to provide support for a pair of two-ton chain hoists 19 for supporting the collapsible chutes 20.

Referring to FIGS. 2, 3, 4 and 5, the upper stiffener ring assembly 15 on the coke drum 1 has attached thereto a pair of main load hydraulic cylinders 21 and 22. Similarly, the upper stiffener ring assembly 16 on the coke drum 2 has a pair of main load hydraulic cylinders 23 and 24 mounted thereon. Each pair of hydraulic cylinders 21, 22 and 23, 24 form an actuator system capable of resisting anticipated coke and hydrostatic loads during all phases of the unheading operation. Although the present embodiment discloses a hydraulic actuator system having one end connected to the coke drum, a fixed structure, the fixed structure may be provided by an unheading deck suitably reinforced. Other actuator systems would also be possible.

Although not shown in the figures, the actuator systems of the present invention are adapted for operation from locations remote from the coke drum outlets. This enables the unheading operators to avoid the vicinity of the coke drum outlets during unheading operations.

Each of the coke drums 1 and 2 also includes a drumhead 25 having a generally T-shaped cover stiffener comprising an actuator support portion 26 and a hinge support portion 27 extending transversely to the actuator support portion 26.

Describing now the actuator system on the coke drum 1, the hydraulic cylinders 21 and 22 are attached to the upper stiffener ring assembly 15 by pairs of support lugs 28 and 29, respectively, using pins of conventional design to provide a pivotal connection. The hydraulic cylinders are attached to the drumhead 25 by means of universal joints 30 and 31 each of which are mounted by pins to the drumhead cover stiffener and one of the hydraulic cylinders to provide a pivotal connection. Hydraulic cylinder plunger dust covers 32 and 33 are provided to keep the cylinder plungers free of coke and other foreign matter.

To secure the drumheads 25 to the coke drums when the heads are in a closed position, a circumferential arrangement of bolts 34 is provided extending through mating circumferential flanges on the coke drum outlets 13, 14 and the drumheads 25.

Mounted to the outlets 13 and 14 of the coke drums 1 and 2 are pairs of hinge tabs 35. The drumheads 25, in turn, are provided with hinge tabs 36 extending from the hinge support portions 27 of the cover stiffeners. A pin connecting the hinge tabs 35 and 36 provides a pivotal connection between each drumhead 25 and a respective coke drum 1 and 2. Other forms of movable connection would also be possible.

Figure 6:
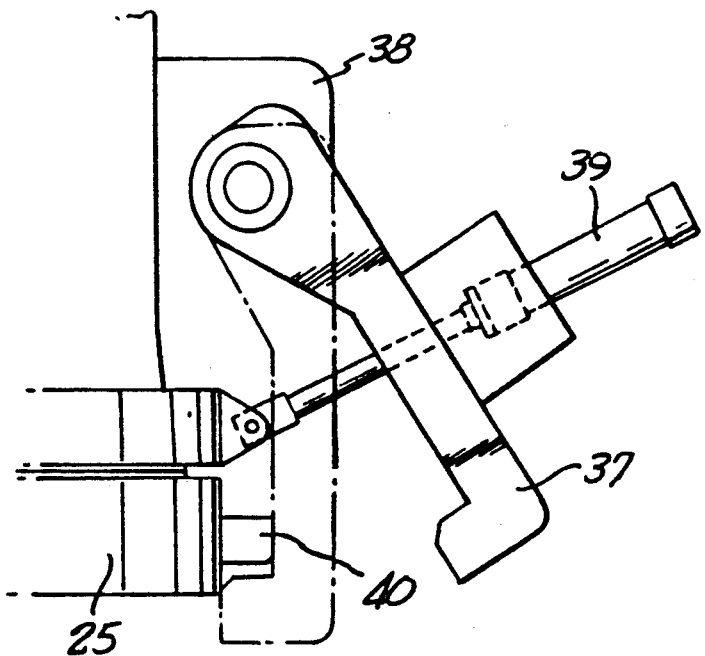
FIG. 6 is a detailed side view of a safety lock for locking a drumhead in a closed position.

Each coke drum 1 and 2 is provided with a pair of safety lock devices 37 that secure the drumheads 25 in place while operators are working thereunder to prevent accidental opening in the event of a hydraulic line or cylinder rupture. The safety locks 37, shown in detail in FIG. 6, are pivotally mounted to the drum outlets 13 and 14 by means of safety lock support tabs 38. The safety locks 37 are pivotable between closed and open positions by means of actuators 39. In the closed position the safety locks 37 are aligned with tabs 40 mounted to the drumheads 25 which are sized to support anticipated coke and hydrostatic loads.

Referring to FIG. 2, lines 50 and 52 serve to feed hot hydrocarbon to the appropriate drum, and following completion of the coking portion of the cycle serve to remove fluid from that drum. The lines 50 and 52 are joined with a flanged connection 54. The line 50 is adapted to remain fixed to the drumhead. During unheading operations, a connection 54 is broken to separate the lines 50 and 52 and permit the drumhead, together with the line 50 to be displaced from the coke drum outlet.

Thus, an actuator controlled unheading device has been described that is operable from a location remote from a drum outlet and which is capable of withstanding high loads. While embodiments and applications of this invention have been shown and described, it will be apparent to those skilled in the art that many more modifications are possible without departing from the inventive concepts herein. For example, as described above, non-hydraulic actuating means such as gear drives and the like could be employed in an actuator system. The invention, therefore, is not to be restricted except in the spirit of the appended claims.

We claim:

1. In a coke drum system including a drum body and a drumhead, the improvement in combination therewith comprising:

an actuator means for moving said drumhead relative to said drum body, said actuator means being operable from a location remote from said drumhead;

said drum body having an upper cylindrical portion and a lower frusto conical portion terminating at a cylindrical drum outlet;

said drum body further including a stiffener ring means for supporting said actuator means and circumferentially mounted on said frusto conical lower portion, said stiffener ring means including one or more mounting lugs to provide actuator means support;

said drum outlet including flange hinge tabs for mounting said drumhead;

said drumhead being circular and configured to mate with said drum outlet and having mounted thereto a generally T-shaped cover stiffener including an actuator support portion having opposing ends and a hinge support portion;

said hinge support portion having a cover hinge tab extending therefrom;

said cover hinge tab being pivotally mounted by pin means to said flange hinge tabs;

said actuator support portion of said cover stiffener having pivotally mounted to the ends thereof a pair of universal joints to provide actuator means support;

said actuator means comprising a pair of hydraulic cylinders mounted at one end to said universal joints and at the other end to said mounting lugs whereby actuation of said hydraulic cylinders pivots said drumhead between closed and open positions with respect to said drum body outlet.

2. The coke drum system set forth in claim 1 further including a first feedline nonremovably connected to and extending from the center of said drumhead and a second feedline removably connected to said first feedline.

3. A delayed coke system comprising a coke drum body having an outlet, a drumhead pivotaly mounted to said drum body, actuator means for moving said drumhead relative to said drum body to pen or close said outlet, said actuator means being operable from a location remote from said drumhead, said drum body further including stiffener means mounted thereon for supporting said actuator means, said stiffener means including one or more mounting lugs to provide actuator support, said drum outlet including flange hinge tabs for mounting said drumhead, said drumhead being configured to mate with said drum outlet and having mounted thereto a cover stiffener including an actuator support portion having opposed ends and a hinge support portion, said actuator means comprising hydraulic cylinders mounted at one end to the opposing ends of said actuator support portions and at the other end to said mounting lugs, whereby actuation of said hydraulic cylinder pivots said drumhead between closed and open positions with respect to said drum body outlet.

4. The delayed coker system of claim 3 in which said actuator support portion of said cover stiffener includes a pair of universal joints pivotally mounted to the ends thereof and to the one end of each of said hydraulic cylinders to provide actuator support.

5. The delayed coker system of claim 3 further including safety lock means mounted to said drum body for engaging said drumhead in the closed position to prevent accidental pivoting of said drumhead in the event of a loss of hydraulic fluid pressure in said hydraulic cylinders.

* * * * *